United States Patent [19]

Thorn

[11] Patent Number: 4,899,663

[45] Date of Patent: Feb. 13, 1990

[54] PERCUSSION INITIATED INFLATOR ASSEMBLY

[75] Inventor: William F. Thorn, Redmond, Wash.

[73] Assignee: Automotive Systems Laboratory, Inc., Farmington Hills, Mich.

[21] Appl. No.: 310,858

[22] Filed: Feb. 15, 1989

[51] Int. Cl.[4] .............................................. F42B 3/04
[52] U.S. Cl. .................................... 102/530; 102/204; 102/275.12; 102/702; 280/741
[58] Field of Search ................ 102/204, 275.12, 275.6, 102/305, 311, 322, 530, 531, 702; 280/734, 735, 736, 741

[56] References Cited

U.S. PATENT DOCUMENTS

| | | |
|---|---|---|
| 3,162,127 | 12/1964 | Breslow et al. |
| 3,430,563 | 3/1969 | Stresau ............................ 102/305 |
| 3,532,358 | 10/1970 | Selwa et al. .................... 280/741 |
| 3,663,035 | 5/1972 | Norton ............................. 102/531 |
| 3,724,870 | 4/1973 | Kurokawa et al. ............. 280/741 |
| 3,896,731 | 7/1975 | Kilmer ............................. 102/305 |
| 4,136,894 | 1/1979 | Ono et al. ....................... 280/741 |

Primary Examiner—Harold J. Tudor
Attorney, Agent, or Firm—Lyman R. Lyon

[57] ABSTRACT

A percussion initiated inflator assembly for an airbag comprises a detonator panel that effects essentially simultaneous ignition of a plurality of gas generators by a shock wave.

1 Claim, 1 Drawing Sheet

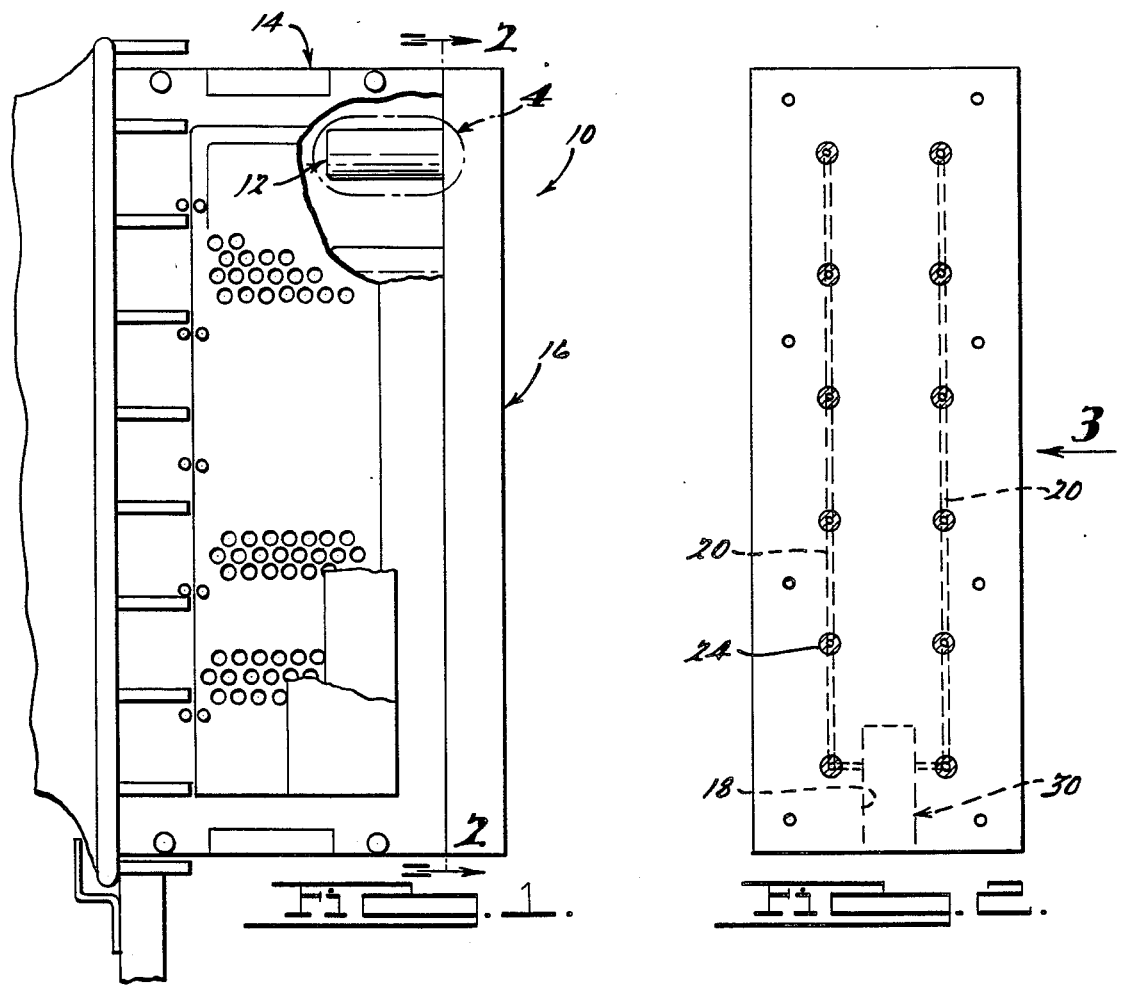
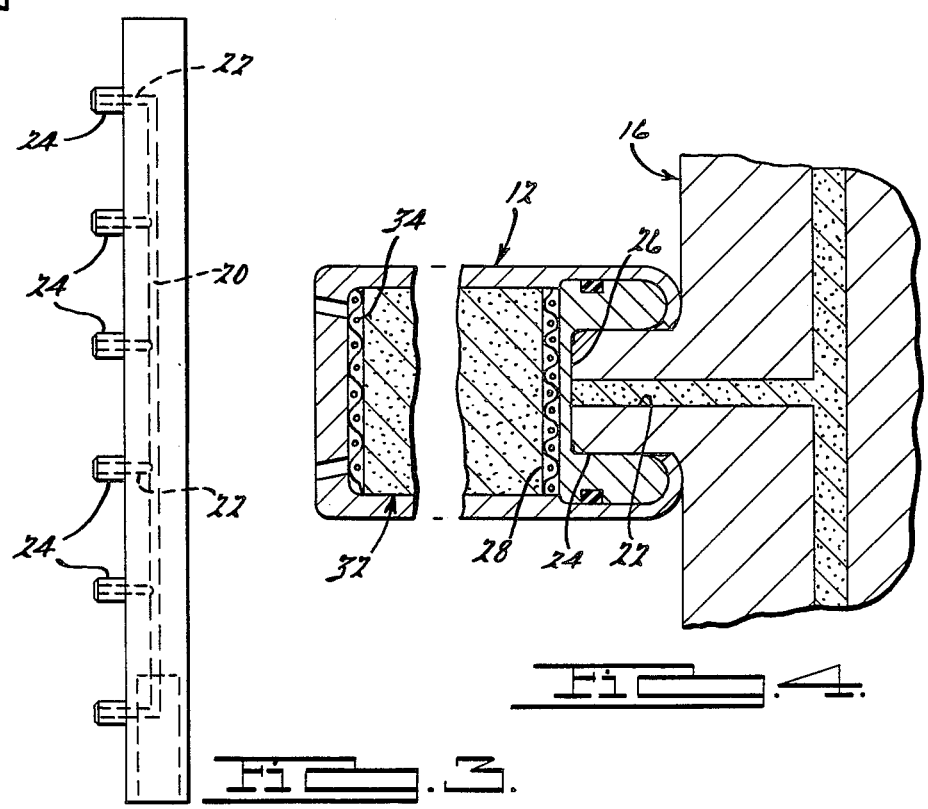

PERCUSSION INITIATED INFLATOR ASSEMBLY

BACKGROUND OF THE INVENTION

First generation inflation systems for automotive airbag applications generally used a single gas generator to effect bag inflation. Typically, the gas generator was ignited electrically by use of a pyrotechnic detonator. Subsequently, multiple gas generators, which exhibit a relatively higher pumping ratio, were used as the primary gas source for such inflators. In addition, multiple gas generators provide improved inflator reliability upon the occurrence of cartridge or ignition failure. Moreover, multiple cartridges present a means to control inflator output for use in a crash adaptive system.

However, a problem exists in the use of multiple electrically ignited gas generators due to the relatively high energy requirement necessary to achieve simultaneous ignition and due to the use of multiple, bridge-wire-type ignition squibs.

SUMMARY OF THE INVENTION

The present invention features multiple gas generators that are percussion ignited by a single detonator. The detonator effects ignition of a percussion primer at each gas generator. The detonator is supported in a plastic housing containing one or more main explosive traces that communicate through relatively short lateral traces with each cartridge. When initiated by an electrical sensor, the detonator explosion propagates a shock wave that travels along each main trace and out each lateral trace to virtually simultaneously deliver shock waves to the end of each lateral trace, normally within 100 nanoseconds of one another. The shock wave energy is utilized to ignite percussion primers of the gas generators in communication with each lateral trace. A diaphragm of controlled thickness is placed between the end of the lateral trace of the multipoint initiator and the primer of the gas generator to function as a seal for the gas generator.

BRIEF DESCRIPTION OF THE DRAWINGS

FIG. 1 is an elevational view of an inflator assembly utilizing percussion initiated gas generators in accordance with the instant invention.

FIG. 2 is a view taken along the line 2—2 of FIG. 1.

FIG. 3 is a view taken in the direction of the arrow 3 of FIG. 2.

FIG. 4 is a view taken within the circle 4 of FIG. 1.

DETAILED DESCRIPTION OF THE PREFERRED 7EMBODIMENT OF THE INVENTION

An inflator assembly 10, in accordance with an exemplary constructed embodiment of the instant invention, comprises twelve gas generating cartridges 12, one of which is shown, mounted internally of a hollow generally rectangular housing 14. A multipoint detonator panel 16 supports said cartridges 12 and defines the rear closure of the inflator housing 14.

As seen in FIG. 2, the detonator panel 16, is molded from, for example, plastic, and is of generally rectangular configuration. A detonator cavity 18 communicates with one end of the panel 16. A pair of parallel main explosive traces 20, communicate with the cavity 18 and with a plurality of lateral explosive traces 22. The traces 22 communicate with a like plurality of cartridge positioning bosses 24 on the panel 16 and with a diaphragm 26 of each cartridge 12. The diaphragm 26 of each cartridge 12 is disposed exteriorly of a conventional primer 28 located internally of the shotgun shell type gas generating cartridge 12, in the conventional manner.

Ignition of the gas generator 12 of the inflator assembly 10 is effected by an electrical signal to a detonator 30 located in the detonator cavity 18 of the detonator panel 16. The inflator assembly 10 may be of an aspirating or a direct inflating type but preferably contains multiple gas generating cartridges ranging from 2 to 20. The configuration of the explosive traces 20 and the location of the detonator 30 is a matter of design choice since the explosive trace can follow virtually any manufacturable path and can be initiated anywhere along the length thereof. The only configuration restraint is that each lateral trace terminate at a site desired for a gas generator cartridge 12. The gas generating cartridge 12 may be closed as by the diaphragm 26 as shown or may be open; i.e., with no diaphragm, whereby the lateral initiator trace is in direct communication with the primer 28 of the cartridge 12. When used, the diaphragm 26 should typically be 0.020 to 0.030 inches thick for best ignition and sealing. The diaphragm 26 may also be formed with a raised button of small diameter on the primer side to act as an energy concentrator and firing pin when impacting the primer 28 under influence of the shock wave. The location of the end plane of the lateral initiator trace 22 will normally be from flush with the diaphragm 26 or primer 28, to a gap of 0.010 inch. The shotshell-type gas generating cartridge 12 contains a conventional propellant 32 and filter 34.

One explosive trace material suitable for use in the instant invention is known as XTX-8003 developed by Los Alamos National Laboratory and comprises a mixture of microcrystalline PETN (80%) and Sylgard silicone rubber binder (20%).

While the preferred embodiment of the invention has been disclosed, it should be appreciated that the invention is susceptible of modification without departing from the scope of the following claims.

I claim:

1. A percussion initiated inflator assembly comprising a housing,
an airbag forming a front wall of said housing,
a rigid detonator panel forming a rear wall of said housing,
a plurality of gas generating cartridge supported within said housing by said detonator panel,
a percussion initiated primer in each of said cartridges,
a diaphragm between the percussion primer of each of said cartridges and said detonator panel,
a single detonator supported internally of said detonator panel in spaced relation to said cartridges, and
an explosive trace disposed internally of said detonator panel and extending from said detonator to the diaphragm of each of said cartridges, respectively, for effective percussion ignition thereof.

* * * * *